US012560280B2

(12) United States Patent
Arsa

(10) Patent No.: US 12,560,280 B2
(45) Date of Patent: Feb. 24, 2026

(54) ENGINE OIL SYSTEM FOR AN AIRCRAFT PROPULSION SYSTEM AND METHOD FOR CONTROLLING SAME

(71) Applicant: Pratt & Whitney Canada Corp., Longueuil (CA)

(72) Inventor: Christophe Arsa, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 97 days.

(21) Appl. No.: 18/673,470

(22) Filed: May 24, 2024

(65) Prior Publication Data

US 2025/0361983 A1      Nov. 27, 2025

(51) Int. Cl.
*G05D 1/00* (2024.01)
*F16N 39/06* (2006.01)

(52) U.S. Cl.
CPC .......... *F16N 39/06* (2013.01); *F15B 2211/40* (2013.01); *F16N 2210/08* (2013.01); *F16N 2250/04* (2013.01); *F16N 2250/08* (2013.01); *G05B 2219/37333* (2013.01)

(58) Field of Classification Search
CPC ...................................... F16N 39/06
See application file for complete search history.

(56) References Cited

U.S. PATENT DOCUMENTS

| 10,409,275 | B2 | 9/2019 | Hagen |
| 10,526,992 | B2 | 1/2020 | Whitney |
| 10,830,091 | B2 | 11/2020 | Haye |
| 2009/0299535 | A1 | 12/2009 | Delaloye |
| 2018/0058280 | A1 | 3/2018 | Pursifull |
| 2022/0090515 | A1 | 3/2022 | Beecroft |

FOREIGN PATENT DOCUMENTS

| CN | 106383013 A | 2/2017 |
| WO | 2024062204 A1 | 3/2024 |

OTHER PUBLICATIONS

EP Search Report for EP Patent Application No. 25178606.7 dated Sep. 26, 2025.

*Primary Examiner* — Vivek D Koppikar
*Assistant Examiner* — Paul W Arellano
(74) *Attorney, Agent, or Firm* — Getz Balich LLC

(57) ABSTRACT

An engine oil system includes a filter assembly, a sensor assembly, and a controller. The filter assembly includes a filter and a bypass valve. The filter assembly forms a portion of an oil flow path of the engine oil system. The sensor assembly includes an inlet pressure sensor, an outlet pressure sensor, and a temperature sensor. The controller is configured to control a position of the bypass valve in the open position or the closed position with an unfaulted control routine using a temperature ($T_{OIL}$) measured by the temperature sensor and a differential pressure ($\Delta P_{OIL}$) measured by the inlet pressure sensor and the outlet pressure sensor, execute a bypass valve control algorithm configured to identify a faulted condition and an unfaulted condition of the sensor assembly, and identify the faulted condition or the unfaulted condition using the bypass valve control algorithm. The faulted condition is identified where the temperature ($T_{OIL}$) or the differential pressure ($\Delta P_{OIL}$) is outside of an expected temperature range or an expected differential pressure range, respectively.

20 Claims, 5 Drawing Sheets

ENGINE OIL SYSTEM FOR AN AIRCRAFT PROPULSION SYSTEM AND METHOD FOR CONTROLLING SAME

TECHNICAL FIELD

This disclosure relates to oil systems for aircraft propulsion systems.

BACKGROUND OF THE ART propulsion systems for aircraft may typically include rotational equipment configured for facilitating aircraft propulsion, generating electrical power, and/or other functions of aircraft operation. In many cases, rotational equipment may require lubrication and/or cooling, for example, using one or more oil systems to distribute oil to the rotational equipment and/or other oil loads. Various oil systems are known in the art. While these known systems may be useful for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an engine oil system for an aircraft propulsion system includes a filter assembly, a sensor assembly, and a controller. The filter assembly includes an oil inlet, an oil outlet, a filter, and a bypass valve. The filter assembly forms a portion of an oil flow path of the engine oil system from the oil inlet to the oil outlet. Each of the filter and the bypass valve are connected in fluid communication with and between the oil inlet and the oil outlet. The bypass valve is positionable in an open position and a closed position. The sensor assembly includes an inlet pressure sensor, an outlet pressure sensor, and a temperature sensor. The inlet pressure sensor is disposed at the oil inlet. The outlet pressure sensor is disposed at the oil outlet. The temperature sensor is disposed at the oil flow path. The controller is connected in signal communication with the inlet pressure sensor, the outlet pressure sensor, the temperature sensor, and the bypass valve. The controller includes a processor connected in signal communication with a non-transitory memory storing instructions which, when executed by the processor, cause the processor to control a position of the bypass valve in the open position or the closed position with an unfaulted control routine using a temperature ($T_{OIL}$) measured by the temperature sensor and a differential pressure ($\Delta P_{OIL}$) measured by the inlet pressure sensor and the outlet pressure sensor, execute a bypass valve control algorithm configured to identify a faulted condition and an unfaulted condition of the sensor assembly, and identify a faulted condition or an unfaulted condition of the sensor assembly using the bypass valve control algorithm. The faulted condition is identified where the temperature ($T_{OIL}$) or the differential pressure ($\Delta P_{OIL}$) is outside of an expected temperature range or an expected differential pressure range, respectively, determined by the bypass valve control algorithm based on the position of the bypass valve.

In any of the aspects or embodiments described above and herein, the unfaulted condition may be identified where the temperature ($T_{OIL}$) is within the expected temperature range and the differential pressure ($\Delta P_{OIL}$) is within the expected differential pressure range.

In any of the aspects or embodiments described above and herein, the instructions, when executed by the processor, may further cause the processor to control the position of the bypass valve in the open position or the closed position with a faulted control routine, in response to identifying the faulted condition, using a simulated temperature determined by the bypass valve control algorithm for the position of the bypass valve and the differential pressure ($\Delta P_{OIL}$) and the differential pressure ($\Delta P_{OIL}$).

In any of the aspects or embodiments described above and herein, the instructions, when executed by the processor, may further cause the processor to control the position of the bypass valve in the open position, with the faulted control routine, where the simulated temperature is greater than a temperature threshold and control the position of the bypass valve in the closed position, with the faulted control routine, where the simulated temperature is less than the temperature threshold.

In any of the aspects or embodiments described above and herein, the instructions, when executed by the processor, may further cause the processor to control the position of the bypass valve in the open position or the closed position with a faulted control routine, in response to identifying the faulted condition, using a simulated differential pressure determined by the bypass valve control algorithm for the position of the bypass valve and the temperature ($T_{OIL}$) and the temperature ($T_{OIL}$).

In any of the aspects or embodiments described above and herein, the instructions, when executed by the processor, may further cause the processor to control the position of the bypass valve in the closed position, with the faulted control routine, where the simulated differential pressure is less than a differential pressure threshold.

In any of the aspects or embodiments described above and herein, the instructions, when executed by the processor, may further cause the processor to control the position of the bypass valve in the open position, with the faulted control routine, where the simulated differential pressure is greater than the differential pressure threshold and the temperature ($T_{OIL}$) is greater than a temperature threshold.

In any of the aspects or embodiments described above and herein, the instructions, when executed by the processor, may further cause the processor to control the position of the bypass valve in the closed position, with the faulted control routine, where the simulated differential pressure is greater than the differential pressure threshold and the temperature ($T_{OIL}$) is less than a temperature threshold.

In any of the aspects or embodiments described above and herein, the instructions, when executed by the processor, may further cause the processor to execute a model to train the model to identify the correlation or the non-correlation between the temperature ($T_{OIL}$) and the differential pressure ($\Delta P_{OIL}$) for the position of the bypass valve using the temperature ($T_{OIL}$) measured by the temperature sensor and the differential pressure ($\Delta P_{OIL}$) measured by the inlet pressure sensor and the outlet pressure sensor while controlling the position of the bypass valve with the unfaulted control routine and generate the bypass valve control algorithm.

In any of the aspects or embodiments described above and herein, with the bypass valve in the closed position, the filter assembly may direct substantially all of the oil along the oil flow path through the filter and with the bypass valve in the open position, the filter assembly may direct at least a portion of the oil along the oil flow path through the bypass valve bypassing the filter.

According to another aspect of the present disclosure, a method for controlling a bypass valve of an engine oil system for an engine of an aircraft propulsion system includes measuring a temperature ($T_{OIL}$) of oil within an oil flow path of the engine oil system and measuring a differential pressure ($\Delta P_{OIL}$) of the oil across a filter of the engine oil system during operation of the engine and the engine oil system with a sensor assembly, controlling a position of the bypass valve in an open position or a closed position, with an unfaulted control routine executed at a controller, using the temperature ($T_{OIL}$) and the differential pressure ($\Delta P_{OIL}$). In the open position the bypass valve directs at least a portion of the oil through the bypass valve bypassing the filter. In the closed position the bypass valve directs substantially all of the oil along the oil flow path through the filter. The method further includes executing, at the controller, a model trained to identify correlation or non-correlation between the temperature ($T_{OIL}$) and the differential pressure ($\Delta P_{OIL}$) for the position of the bypass valve and identifying a faulted condition or an unfaulted condition of the sensor assembly, at the controller using the model. The faulted condition identified where the temperature ($T_{OIL}$) or the differential pressure ($\Delta P_{OIL}$) is outside of an expected temperature range or an expected differential pressure range, respectively, determined by the model for the position of the bypass valve.

In any of the aspects or embodiments described above and herein, the unfaulted condition may be identified where the temperature ($T_{OIL}$) is within the expected temperature range and the differential pressure ($\Delta P_{OIL}$) is within the expected differential pressure range.

In any of the aspects or embodiments described above and herein, the method may further include controlling the position of the bypass valve in the open position or the closed position with a faulted control routine executed at the controller, in response to identifying the faulted condition, using a simulated temperature determined by the model for the position of the bypass valve and the differential pressure ($\Delta P_{OIL}$) and the differential pressure ($\Delta P_{OIL}$).

In any of the aspects or embodiments described above and herein, the method may further include controlling the position of the bypass valve in the open position or the closed position with a faulted control routine executed at the controller, in response to identifying the faulted condition, using a simulated differential pressure determined by the model for the position of the bypass valve and the temperature ($T_{OIL}$) and the temperature ($T_{OIL}$).

In any of the aspects or embodiments described above and herein, the method may further include training the model to identify the correlation or the non-correlation between the temperature ($T_{OIL}$) and the differential pressure ($\Delta P_{OIL}$) for the position of the bypass valve using the temperature ($T_{OIL}$) and the differential pressure ($\Delta P_{OIL}$) measured by the sensor assembly and while controlling the position of the bypass valve with the unfaulted control routine.

In any of the aspects or embodiments described above and herein, identifying the faulted condition or the unfaulted condition may include generating a warning in response to identification of the faulted condition.

According to another aspect of the present disclosure, an engine for an aircraft propulsion system includes an engine oil system and a controller. The engine oil system includes an oil flow path, a filter assembly, and a sensor assembly. The engine oil system is configured to direct oil along the oil flow path through one or more engine oil loads of the engine. The filter assembly includes an oil inlet, an oil outlet, a filter, and a bypass valve. The filter assembly forms a portion of the oil flow path from the oil inlet to the oil outlet. Each of the filter and the bypass valve are connected in fluid communication with and between the oil inlet and the oil outlet. The bypass valve is positionable in an open position and a closed position. The sensor assembly is configured to measure a temperature ($T_{OIL}$) of the oil in the oil flow path and a differential pressure ($\Delta P_{OIL}$) of the oil across the filter. The controller is connected in signal communication with the sensor assembly and the bypass valve. The controller includes a processor connected in signal communication with a non-transitory memory including instructions which, when executed by the processor, cause the processor to control a position of the bypass valve in the open position or the closed position with an unfaulted control routine using the temperature ($T_{OIL}$) and the differential pressure ($\Delta P_{OIL}$), execute a model trained to identify correlation or non-correlation between the temperature ($T_{OIL}$) and the differential pressure ($\Delta P_{OIL}$) for the position of the bypass valve, and identify a faulted condition or an unfaulted condition of the sensor assembly using the model. The faulted condition is identified where the temperature ($T_{OIL}$) or the differential pressure ($\Delta P_{OIL}$) is outside of an expected temperature range or an expected differential pressure range, respectively, determined by the model for the position of the bypass valve.

In any of the aspects or embodiments described above and herein, the unfaulted condition may be identified where the temperature ($T_{OIL}$) is within the expected temperature range and the differential pressure ($\Delta P_{OIL}$) is within the expected differential pressure range.

In any of the aspects or embodiments described above and herein, the instructions, when executed by the processor, may further cause the processor to control the position of the bypass valve in the open position or the closed position with a faulted control routine, in response to identifying the faulted condition, using a simulated temperature determined by the model for the position of the bypass valve and the differential pressure ($\Delta P_{OIL}$) and the differential pressure ($\Delta P_{OIL}$).

In any of the aspects or embodiments described above and herein, the instructions, when executed by the processor, may further cause the processor to control the position of the bypass valve in the open position or the closed position with a faulted control routine, in response to identifying the faulted condition, using a simulated differential pressure determined by the model for the position of the bypass valve and the temperature ($T_{OIL}$) and the temperature ($T_{OIL}$).

The present disclosure, and all its aspects, embodiments and advantages associated therewith will become more readily apparent in view of the detailed description provided below, including the accompanying drawings.

DETAILED DESCRIPTION

Figure 1:
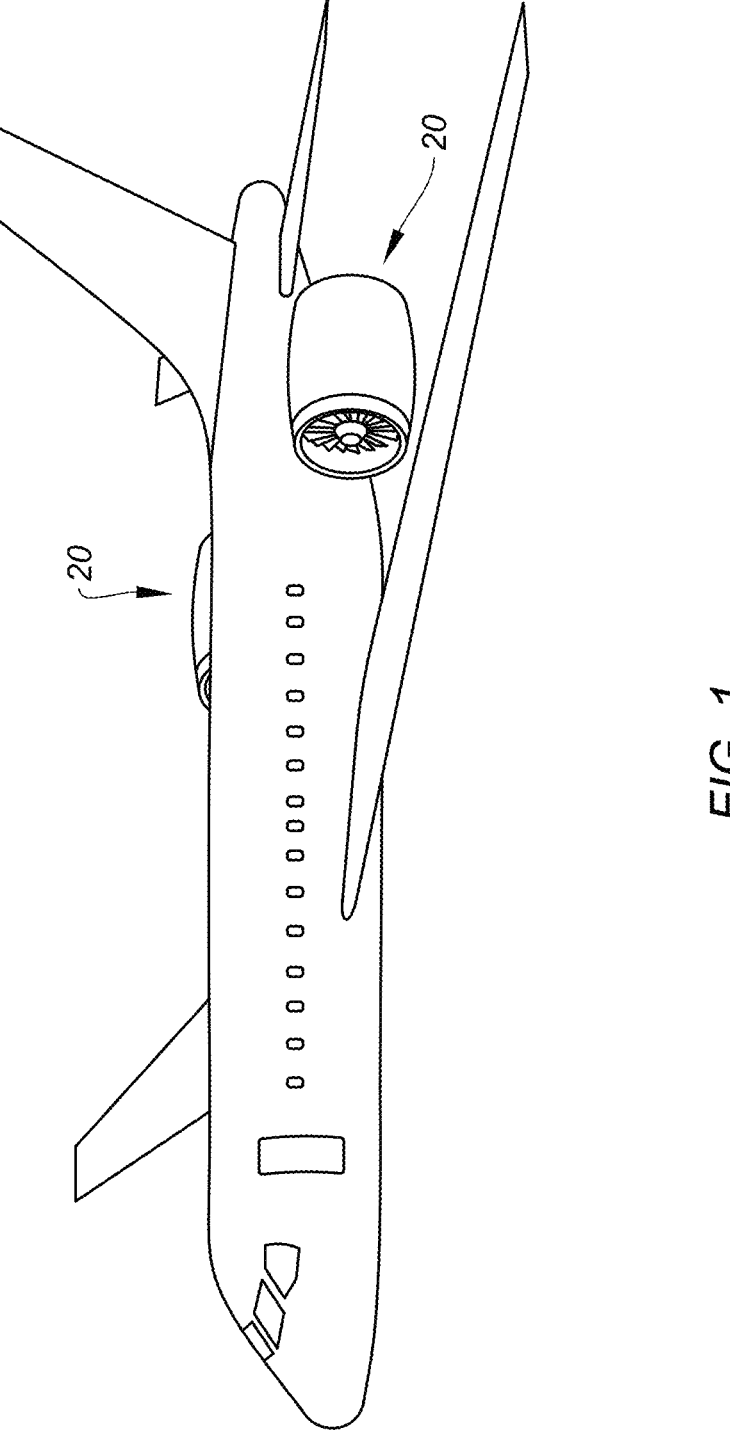
FIG. 1 illustrates a perspective view of an aircraft including a propulsion system, in accordance with one or more embodiments of the present disclosure.
Figure 2:
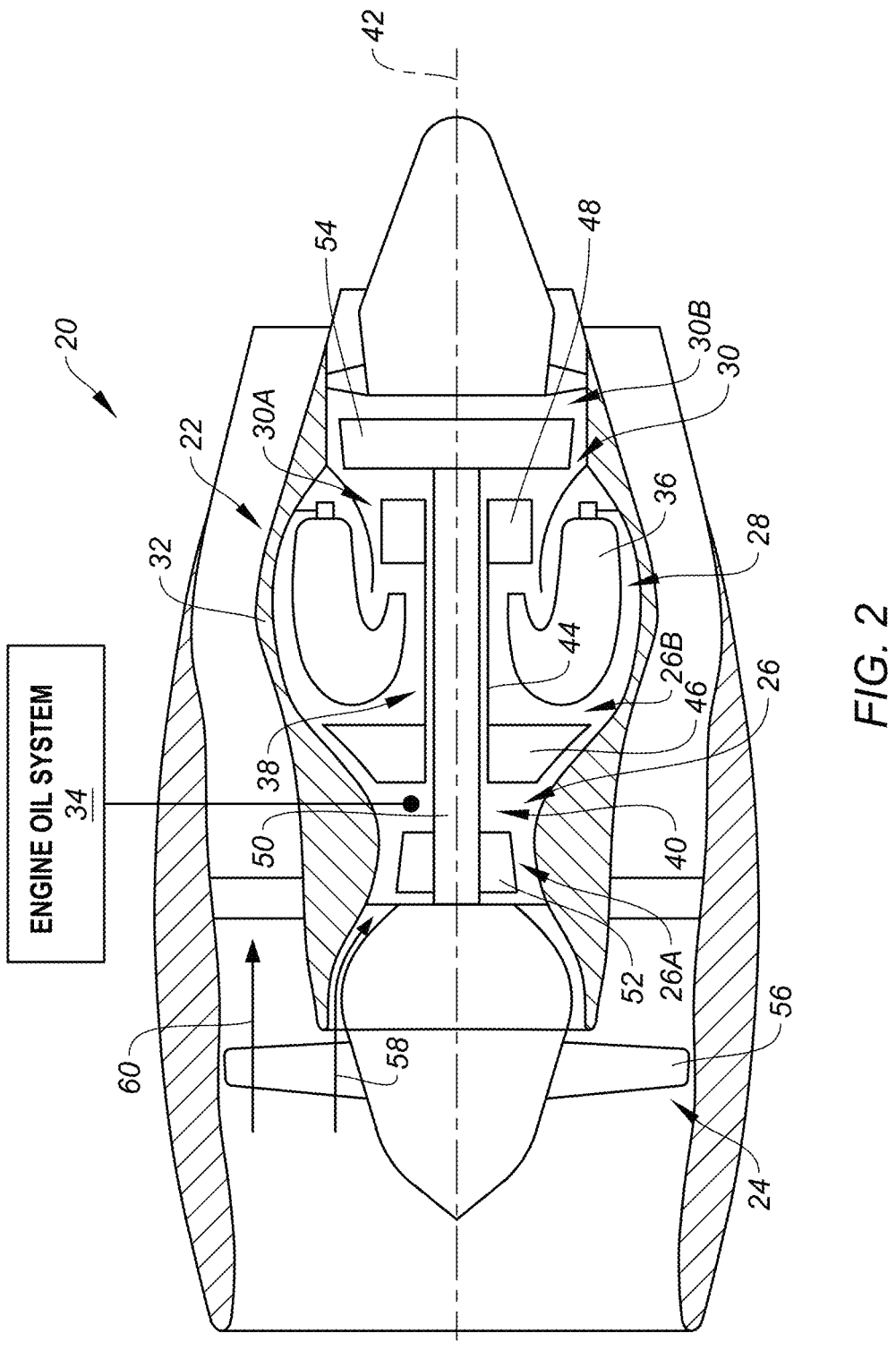
FIG. 2 schematically illustrates a cutaway, side view of an aircraft propulsion system including a gas turbine engine, in accordance with one or more embodiments of the present disclosure.

FIG. 1 illustrates a propulsion system 20 for an aircraft. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone). FIG. 2 schematically illustrates a cutaway, side view of the propulsion system 20.

The propulsion system 20 of FIG. 2 includes a gas turbine engine 22. The gas turbine engine 22 of FIG. 2 is configured as a multi-spool turbofan gas turbine engine. However, while the following description and accompanying drawings may refer to the turbofan gas turbine engine 22 of FIG. 2 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine. Moreover, aspects of the present disclosure may be equally applicable to aircraft propulsion systems including other engine configurations such as, but not limited to, rotary engines, piston engines, and the like, or to electric aircraft propulsion systems (e.g., battery-electric propulsion systems, fuel-cell-electric propulsion systems, etc.).

The gas turbine engine 22 of FIG. 2 includes a fan section 24, a compressor section 26, a combustor section 28, a turbine section 30, an engine static structure 32, and an engine oil system 34. The compressor section 26 of FIG. 2 includes a low-pressure compressor (LPC) section 26A and a high-pressure compressor (HPC) section 26B. The combustor section 28 includes a combustor 36 (e.g., an annular combustor). The turbine section 30 of FIG. 2 includes a high-pressure turbine (HPT) section 30A and a low-pressure turbine (LPT) section 30B.

Components of the fan section 24, the compressor section 26, and the turbine section 30 form a first rotational assembly 38 (e.g., a high-pressure spool) and a second rotational assembly 40 (e.g., a low-pressure spool) of the gas turbine engine 22. The first rotational assembly 38 and the second rotational assembly 40 are mounted for rotation about a rotational axis 42 (e.g., an axial centerline) of the gas turbine engine 22 relative to the engine static structure 32. The present disclosure, however, is not limited to the two-spool gas turbine engine configuration of FIG. 2. For example, aspects of the present disclosure may be equally applicable to single-spool and three-spool gas turbine engine configurations.

The first rotational assembly 38 includes a first shaft 44, a bladed first compressor rotor 46 for the high-pressure compressor section 26B, and a bladed first turbine rotor 48 for the high-pressure turbine section 30A. The first shaft 44 interconnects the bladed first compressor rotor 46 and the bladed first turbine rotor 48.

The second rotational assembly 40 includes a second shaft 50, a bladed second compressor rotor 52 for the low-pressure compressor section 26A, a bladed second turbine rotor 54 for the low-pressure turbine section 30B, and a bladed fan rotor 56 for the fan section 24. The second shaft 50 interconnects the bladed second compressor rotor 52 and the bladed second turbine rotor 54. The second shaft 50 may additionally interconnect the bladed fan rotor 56 with the bladed second compressor rotor 52 and the bladed second turbine rotor 54. Alternatively, the second shaft 50 may be coupled with the bladed fan rotor 56 by a geartrain (e.g., a transmission, a speed change device, an epicyclic geartrain, etc.). The first shaft 44 and the second shaft 50 of FIG. 2 are concentric and configured to rotate about the rotational axis 42. The present disclosure, however, is not limited to concentric configurations of the first shaft 44 and the second shaft 50.

The engine static structure 32 may include one or more engine cases, cowlings, bearing assemblies, inner fixed structures, and/or other non-rotating structures configured to house and/or support (e.g., rotationally support) components of the gas turbine engine sections 24, 26, 28, 30. The engine static structure 32 may form an exterior (e.g., an outer radial portion) of the gas turbine engine 22.

In operation of the gas turbine engine 22, ambient air is directed through the fan section 24 and into a core flow path 58 (e.g., an annular flow path) and a bypass flow path 60 (e.g., an annular flow path) by rotation of the bladed fan rotor 56. Air flow along the core flow path 58 is compressed in the low-pressure compressor section 26A and the high-pressure compressor section 26BB, mixed and burned with fuel in the combustor 36, and the resultant combustion gas is directed through the high-pressure turbine section 30A and the low-pressure turbine section 30B. The bladed first turbine rotor 48 and the bladed second turbine rotor 54 rotationally drive the first rotational assembly 38 and the second rotational assembly 40, respectively, in response to the combustion gas flow through the high-pressure turbine section 30A and the low-pressure turbine section 30B.

Figure 3:
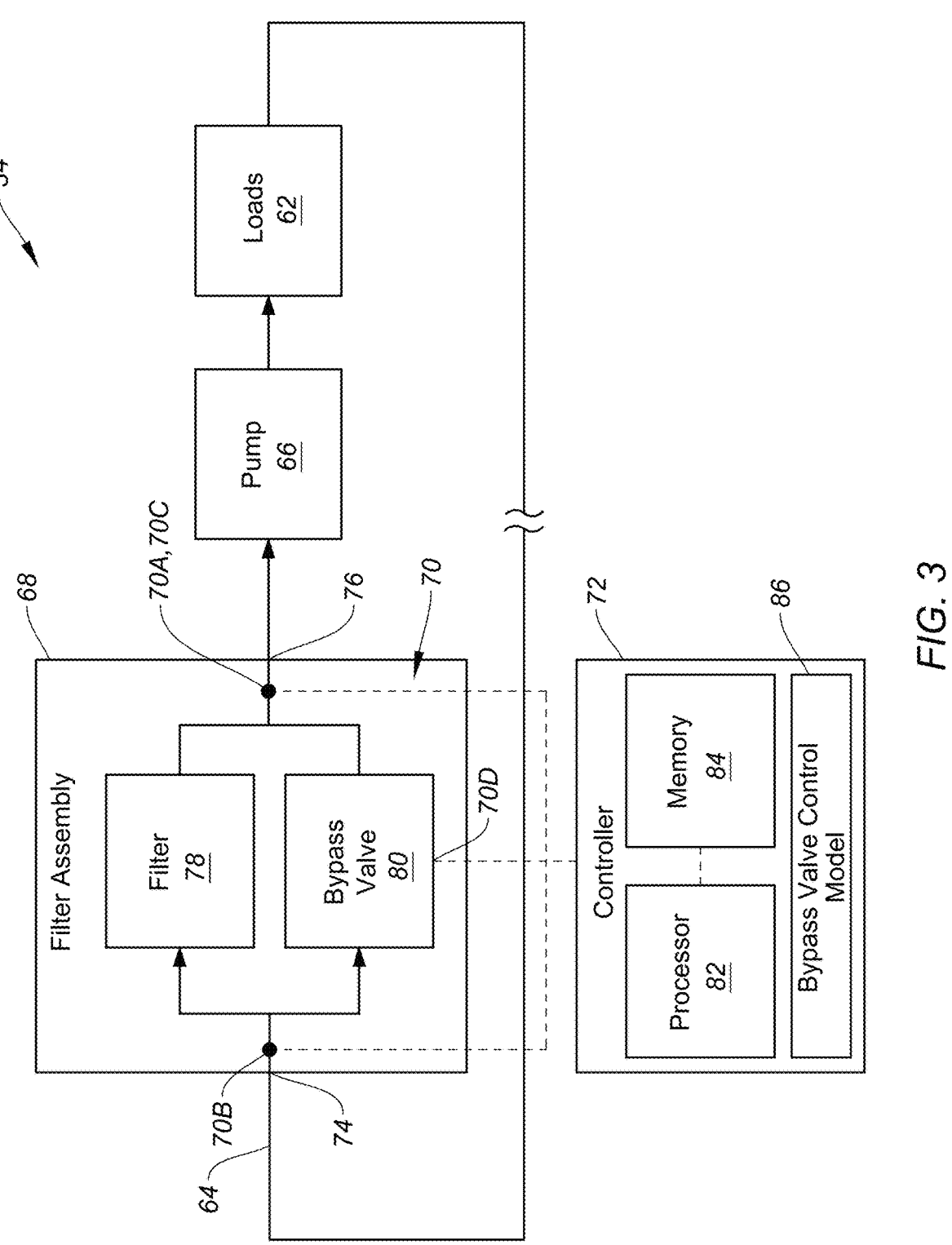
FIG. 3 schematically illustrates an engine oil system for an aircraft propulsion system, in accordance with one or more embodiments of the present disclosure.

Referring to FIGS. 2 and 3, the engine oil system 34 is configured to facilitate lubrication and/or cooling for components of the propulsion system 20 and its gas turbine engine 22. FIG. 3 schematically illustrates the engine oil system 34. The present disclosure is not limited to the foregoing exemplary configuration of the engine oil system 34 of FIG. 3, and the engine oil system 34 may include additional and/or alternative oil system components (e.g., tanks, valves, pumps, conduits, regulators, etc.) suitable for facilitating lubrication and/or cooling for components of the propulsion system 20 and its gas turbine engine 22, referred to herein as engine oil loads 62. The engine oil loads 62 may include, but are not limited to, bearing assemblies, geartrain components (e.g., a gearbox or gear assembly), shafts (e.g., the first shaft 44 and the second shaft 50), and the like.

The engine oil system 34 of FIG. 3 includes an oil flow path 64, a pump 66, a filter assembly 68, a sensor assembly 70, and a controller 72. The pump 66 is configured to circulate oil along the oil flow path 64 to direct (e.g., pump) the oil to the engine oil loads 62 for lubrication and/or cooling of the engine oil loads 62. The filter assembly 68 includes an oil inlet 74, an oil outlet 76, a filter 78 and a bypass valve 80. Oil flow along the oil flow path 64 is directed through the filter assembly 68 (e.g., the filter 78), from the oil inlet 74 to the oil outlet 76, to remove particulate matter and contaminants from the oil.

The bypass valve 80 is connected in fluid communication with and between the oil inlet 74 and the oil outlet 76. As shown in FIG. 3, for example, the bypass valve 80 forms a parallel portion of the oil flow path 64 with the filter 78 from the oil inlet 74 to the oil outlet 76. The bypass valve 80 is positionable in a closed position or an open position. In the closed position of the bypass valve 80, all or substantially all of the oil flow through the filter assembly 68 along the oil flow path 64 is directed through the filter 78. In the open position of the bypass valve 80, at least a substantial portion of the oil flow through the filter assembly 68 along the oil flow path 64 is directed through the bypass valve 80, thereby bypassing the filter 78. The bypass valve 80 of FIG. 3 is a remotely actuated valve. For example, the controller 72 may control the bypass valve 80 to position in the closed position or the open position. Examples of the bypass valve 80 include a solenoid-operated valve, a hydraulically-operated valve, a pneumatically-operated valve, or another suitable valve configuration which may be actuated directed or indirectly by the controller 72, and the present disclosure is not limited to any particular configuration of the bypass valve 80.

The sensor assembly 70 is configured to measure a temperature ($T_{OIL}$) of the oil in the oil flow path 64, a differential pressure ($\Delta P_{OIL}$) of the oil across the filter assembly 68, and a valve position (e.g., the open position or the closed position) of the bypass valve 80. The sensor assembly 70 of FIG. 3 includes a temperature sensor 70A, an inlet pressure sensor 70B, an outlet pressure sensor 70C, and a valve position sensor 70D. The temperature sensor 70A is configured to measure the temperature ($T_{OIL}$) of the oil in the oil flow path 64. The temperature sensor 70A may be configured as a resistance temperature detector (RTD), a thermocouple, or another suitable temperature sensor. The temperature sensor 70A of FIG. 3 is disposed at (e.g., on, adjacent, or proximate) the oil outlet 76, however, the present disclosure is not limited to any particular location of the temperature sensor 70A within the oil flow path 64. The inlet pressure sensor 70B and the outlet pressure sensor 70C are configured to collectively measure the differential pressure ($\Delta P_{OIL}$) of the oil across the filter assembly 68. Alternatively, the sensor assembly 70 may include a single differential-pressure detector configured to measure the differential pressure ($\Delta P_{OIL}$) of the oil across the filter assembly 68. The inlet pressure sensor 70B and the outlet pressure sensor 70C may be configured, for example, as pressure transducers. The inlet pressure sensor 70B is disposed upstream of the filter 78 and the bypass valve 80 in the oil flow path 64. For example, the inlet pressure sensor 70B of FIG. 3 is disposed at (e.g., on, adjacent, or proximate) the oil inlet 74 to measure an inlet pressure ($P_{IN}$) of the oil. The outlet pressure sensor 70C is disposed downstream of the filter 78 and the bypass valve 80 in the oil flow path 64. For example, the outlet pressure sensor 70C of FIG. 3 is disposed at (e.g., on, adjacent, or proximate) the oil outlet 76 to measure an outlet pressure ($P_{OUT}$) of the oil. The valve position sensor 70D identifies a position (e.g., the open position or the closed position) of the bypass valve 80. The valve position sensor 70D may be configured as a valve position sensor which is discrete from or integrated with the bypass valve 80, and configured to identify a physical position of the bypass valve 80 in the open position or the closed position. Alternatively, the valve position sensor 70D may be an electrical or electronic interface of the controller 72 for identifying a controlled position (e.g., an energized or deenergized state) of the bypass valve 80. The present disclosure is not limited to any particular configuration of the valve position sensor 70D for identifying (e.g., in combination with the controller 72) a position of the bypass valve 80.

The controller 72 is connected in communication (e.g., signal communication) with components of the filter assembly 68 including the bypass valve 80 and the sensors 70A-D. The controller 72 includes a processor 82 and memory 84. The processor 82 may include any type of computing device, computational circuit, processor(s), central processing unit (CPU), graphics processing unit (GPU), computer, or the like capable of executing a series of instructions that are stored in memory 84. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the controller 72 to accomplish the same algorithmically and/or coordination of engine oil system 34 components (e.g., the bypass valve 80). The memory 84 may include a single memory device or a plurality of memory devices (e.g., a computer-readable storage device that can be read, written, or otherwise accessed by a general purpose or special purpose computing device, including any processing electronics and/or processing circuitry capable of executing instructions). The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly and/or indirectly coupled to the controller 72. The controller 72 may include, or may be in communication with, a user interface including one or more inputs devices and/or one or more output devices, for example, an input device that enables a user to enter data and/or instructions and an output device configured to display information (e.g., a visual display or a printer), or to transfer data, etc. Communications between the controller 72 and external electrical or electronic devices (e.g., the sensor assembly 70, the bypass valve 80, a user interface, etc.) may be via a hardwire connection or via a wireless connection. A person of skill in the art will recognize that portions of the controller 72 may assume various forms (e.g., digital signal processor, analog device, etc.) capable of performing the functions described herein.

The controller 72 is configured to execute a bypass valve control artificial intelligence (AI) model 86 (hereafter "model" 86) through executed of the instructions stored in memory 84 by the processor 82. Non-limiting examples of the model 86 include different types of AI models including statistical learning methods, or heuristic methods, or the like. The present disclosure is not limited to using any particular AI model for the model 86. The model 86 is trained to identify correlation or non-correlation between operational parameters of the filter assembly 68 including the temperature ($T_{OIL}$), the differential pressure ($\Delta P_{OIL}$) including the inlet pressure ($P_{IN}$) and/or the outlet pressure ($P_{OUT}$), and a valve position (e.g., the open position or the closed position) of the bypass valve 80, as will be discussed in further detail. The model 86 may be trained using a supervised learning methodology and/or an unsupervised learning methodology. The model 86 trained using a supervised learning methodology may be prepared using a training process that includes making predictions based on a body of data (e.g., a training set of labeled filter assembly 68 data) and refining those predictions until the model 86 achieves a desired level of accuracy. The refining process may typically include testing and validating the model 86 using the collected data. In contrast to a supervised learning methodology, an unsupervised learning methodology may use unlabeled filter assembly 68 input data and make predictions based on the input data to generate patterns that exist within the input data. The process of generating the patterns may use various techniques, including but not limited to cluster analysis (e.g., hierarchical clustering, k-means, mixture models, DBSCAN, OPTICS, and the like), principal component, etc. The present disclosure is not limited to using any particular unsupervised learning methodology.

The controller 72 may form or otherwise be part of an electronic engine controller (EEC) for the gas turbine engine 22. The EEC may control operating parameters of the gas turbine engine 22 including, but not limited to, fuel flow, stator vane position (e.g., variable compressor inlet guide vane (IGV) position), compressor air bleed valve position, shaft (e.g., first shaft 44 and/or second shaft 50) torque and/or rotation speed, etc. so as to control an engine power or performance of the gas turbine engine 22. For example, the EEC may modulate fuel flow to the combustor 36 to obtain a desired output power of the gas turbine engine 22. In some embodiments, the EEC may be part of a full authority digital engine control (FADEC) system for the gas turbine engine 22.

During operation of the propulsion system 20 and its engine oil system 34, the bypass valve 80 may typically be positioned in the closed position such that the engine oil system 34 directs all or substantially of the oil flow along the oil flow path 64 through the filter 78. During some operating conditions of the propulsion system 20 and/or its engine oil system 34, however, the bypass valve 80 may be positioned in the open position to protect the filter 78 from high differential pressure ($\Delta P_{OIL}$) conditions and/or to facilitate sufficient oil flow to the engine oil loads 62. For example, the differential pressure ($\Delta P_{OIL}$) may increase as a result of the filter 78 becoming fully or substantially obstructed (e.g., clogged by particulate matter), thereby reducing oil flow through the engine oil system 34 along the oil flow path 64. The differential pressure ($\Delta P_{OIL}$) may also be sufficiently during a cold-start condition of the propulsion system 20 (e.g., the gas turbine engine 22) as a result of the viscosity of the cold oil in the engine oil system 34. Accordingly, the bypass valve 80 may be selectively positioned in the open position (e.g., by the controller 72) to facilitate sufficient oil flow to the engine oil loads 62 during a range of propulsion system 20 operating conditions and/or filter 78 obstruction.

Figure 4:
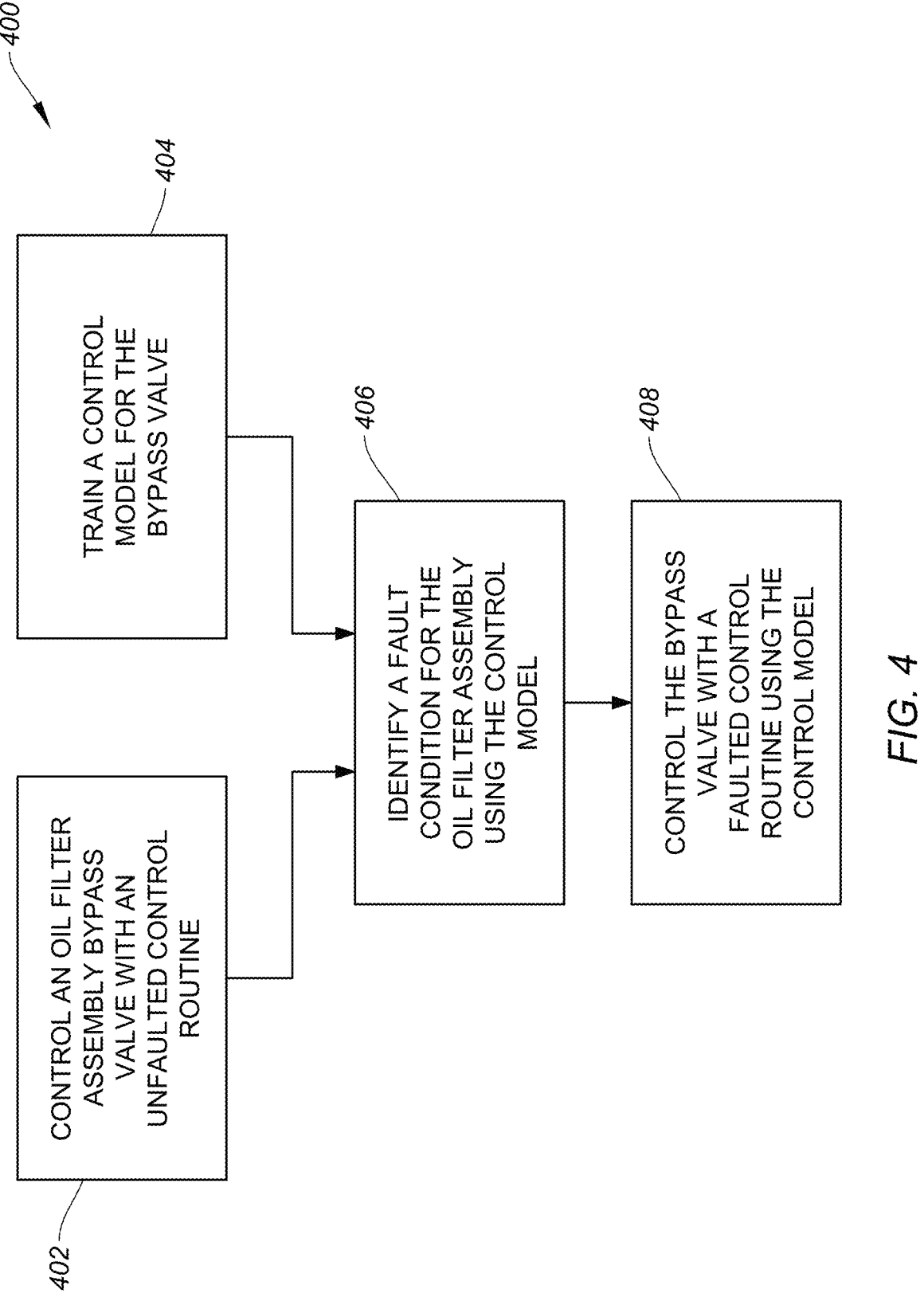
FIG. 4 illustrates a block diagram depicting a method for controlling a bypass valve of an engine oil filter assembly, in accordance with one or more embodiments of the present disclosure.

Referring to FIGS. 3 and 4, a method 400 for controlling a bypass valve of an engine oil filter assembly is provided. FIG. 4 illustrates a flowchart for the Method 400. The method 400 may be performed for the propulsion system 20, the engine oil system 34, and the filter assembly 68, as described herein. The controller 72 may be used to execute or control one or more steps of the method 400. For example, the processor 82 may execute instructions stored in memory 84, thereby causing the controller 72 and/or its processor 82 to execute or otherwise control one or more steps of the method 400. However, it should be understood that the method 400 is not limited to use with the propulsion system 20, the engine oil system 34, the filter assembly 68, or the controller 72 described herein. Unless otherwise noted herein, it should be understood that the steps of method 400 are not required to be performed in the specific sequence in which they are discussed below and, in some embodiments, the steps of method 400 may be performed separately or simultaneously.

Figure 5:
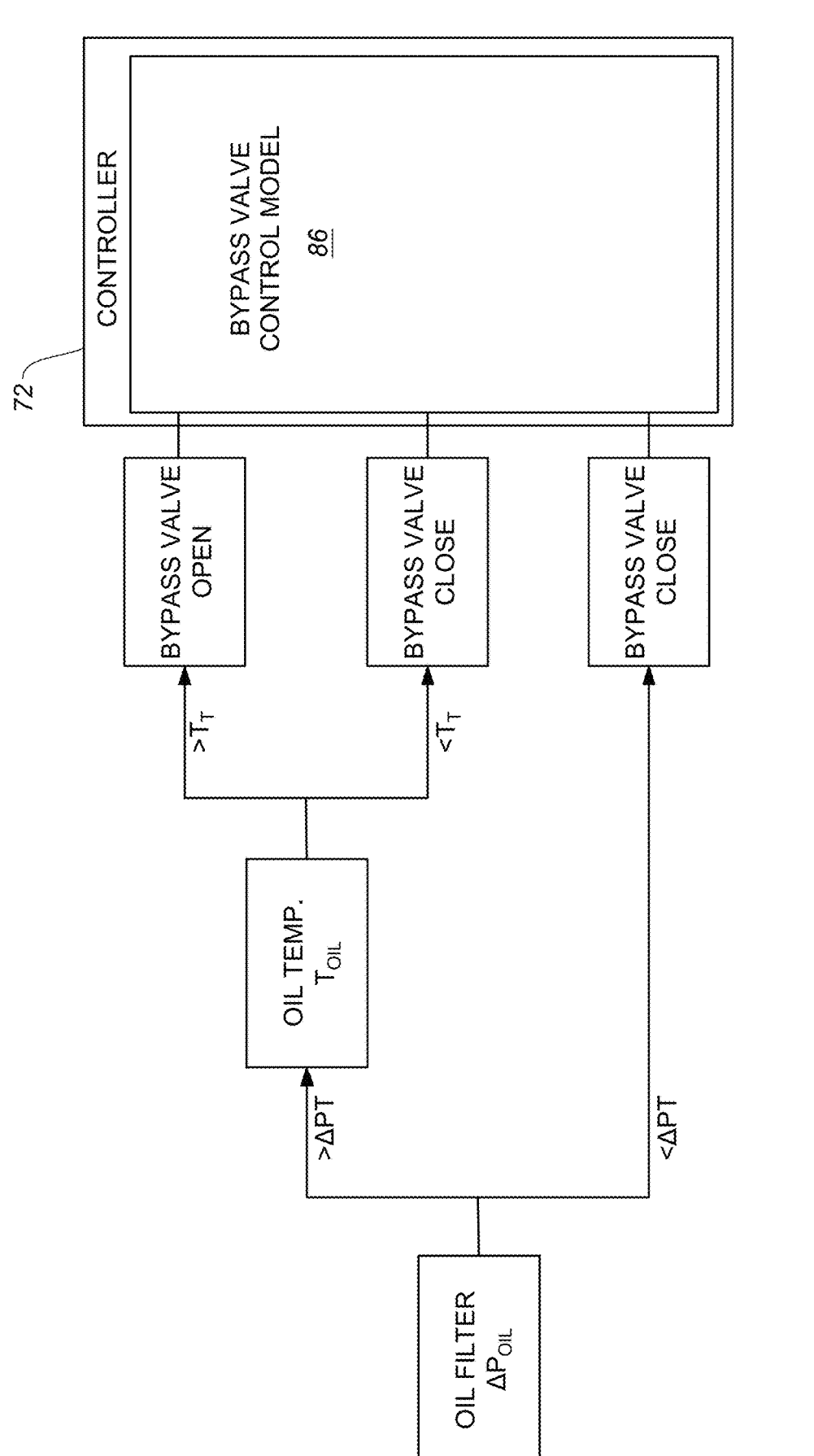
FIG. 5 schematically illustrates a bypass valve control routine and bypass valve control model for an engine oil filter assembly, in accordance with one or more embodiments of the present disclosure.

Step 402 includes controlling a position of the bypass valve 80 during operation of the gas turbine engine 22 and its engine oil system 34. The controller 72 may control the position of the bypass valve 80 with an unfaulted control routine. FIG. 5 illustrates a block diagram depicting the unfaulted control routine. As used herein, the terms "unfaulted" and "faulted" refer to an unfaulted condition and a faulted condition, respectively, of the sensor assembly 70 (e.g., the temperature sensor 70A, the inlet pressure sensor 70B, the outlet pressure sensor 70C, and/or the valve position sensor 70D). In an unfaulted condition, the sensors 70A-D generate or otherwise indicate an output which is representative (e.g., accurately identifies) of a corresponding measured operating parameter of the filter assembly 68 including the differential pressure ($\Delta P_{OIL}$), the temperature ($T_{OIL}$), and the valve position of the bypass valve 80. In contrast, in a faulted condition, the sensors 70A-D generate or otherwise indicate an output which is not representative of a corresponding measured operating parameter of the filter assembly 68 including the differential pressure ($\Delta P_{OIL}$), the temperature ($T_{OIL}$), and the valve position of the bypass valve 80.

The controller 72 may execute the unfaulted control routine of FIG. 5 for the bypass valve 80 using the measured values of the differential pressure ($\Delta P_{OIL}$) and the temperature ($T_{OIL}$) (e.g., measured by the sensor assembly 70). The controller 72 may identify the differential pressure ($\Delta P_{OIL}$) is greater than or less than a differential pressure threshold ($\Delta P_T$). In response to identifying the differential pressure ($\Delta P_{OIL}$) is less than the differential pressure threshold ($\Delta P_T$), the controller 72 may control the bypass valve 80 in the closed position such that all or substantially all oil flow through the filter assembly 68 is directed through the filter 78. In response to identifying the differential pressure ($\Delta P_{OIL}$) is greater than the differential pressure threshold ($\Delta P_T$), the controller 72 may identify the temperature ($T_{OIL}$) is greater than or less than a temperature threshold ($T_T$). In response to identifying the temperature ($T_{OIL}$) is less than the temperature threshold ($T_T$), the controller 72 may control the bypass valve 80 in the closed position such that all or substantially all oil flow through the filter assembly 68 is directed through the filter 78. In response to identifying the temperature ($T_{OIL}$) is greater than the temperature threshold ($T_T$), the controller 72 may control the bypass valve 80 in the open position such that at least a substantial portion of the oil flow through the filter assembly 68 is directed through the bypass valve 80, thereby bypassing the filter 78. Routine experimentation and/or analysis may be performed by one of ordinary skill in the art to select values of the differential pressure threshold ($\Delta P_T$) and the temperature threshold ($T_T$) suitable for satisfying oil flow rate and oil temperature requirements of a given engine assembly, in accordance with and as informed by one or more aspects of the present disclosure.

Step 404 includes training the model 86 to identify correlation or non-correlation between the temperature ($T_{OIL}$), the differential pressure ($\Delta P_{OIL}$) including the inlet pressure ($P_{IN}$) and/or the outlet pressure ($P_{OUT}$), and the valve position of the bypass valve 80. The model 86 may be trained during operation of the gas turbine engine 22 and its engine oil system 34, for example, concurrent with control of the bypass valve 80 with the unfaulted control routine as described for step 402 above. The model 86 may be trained (e.g., using an unsupervised learning methodology) using measured values of the temperature ($T_{OIL}$), the inlet pressure ($P_{IN}$), the outlet pressure ($P_{OUT}$), the differential pressure ($\Delta P_{OIL}$), and the valve position of the bypass valve 80. The model 86 may additionally or alternatively be trained independent of the operation of the gas turbine engine 22 and its engine oil system 34 (e.g., using an unsupervised learning methodology or a supervised learning methodology including verification by an operator). For example, the model 86 may be trained using historical operating data (e.g., values of temperature ($T_{OIL}$), the inlet pressure ($P_{IN}$), the outlet pressure ($P_{OUT}$), the differential pressure ($\Delta P_{OIL}$), and the bypass valve position) for one or more same or similar propulsion systems and/or engines. For further example, the model 86 may be trained using simulated operating data (e.g., values of temperature ($T_{OIL}$), inlet pressure ($P_{IN}$), outlet pressure ($P_{OUT}$), differential pressure ($\Delta P_{OIL}$), and bypass valve position) for the gas turbine engine 22 and its engine oil system 34. Accordingly, the model 86 may be trained to correlate the valve position of the bypass valve 80 (e.g., the open position or the closed position) with values of the temperature ($T_{OIL}$) and the inlet pressure ($P_{IN}$), the outlet pressure ($P_{OUT}$), and/or the differential pressure ($\Delta P_{OIL}$). Based on the training, the model 86 may determine an expected range (e.g., an expected temperature range, pressure range, and/or differential pressure range) for the temperature ($T_{OIL}$), the inlet pressure ($P_{IN}$), the outlet pressure ($P_{OUT}$), and/or the differential pressure ($\Delta P_{OIL}$) corresponding to a given value position of the bypass valve 80. The expected ranges may be identified by the model 86 as having a high probability (e.g., greater than a probability threshold) of including the actual temperature ($T_{OIL}$), inlet pressure ($P_{IN}$), outlet pressure ($P_{OUT}$), and/or differential pressure ($\Delta P_{OIL}$) for the given valve position of the bypass valve 80.

Step 406 includes identifying a faulted condition of the sensor assembly 70. For example, the controller 72 may identify a faulted condition of one or more of the temperature sensor 70A, the inlet pressure sensor 70B, and the outlet pressure sensor 70C using the model 86 or a bypass valve control algorithm generated by the trained model 86 (see step 404). One or more of the sensors 70A-C may be identified by the controller 72 as having a faulted condition where a respective measured output of the sensors 70A-C (e.g., the temperature ($T_{OIL}$), the inlet pressure ($P_{IN}$), the outlet pressure ($P_{OUT}$), and/or the differential pressure ($\Delta P_{OIL}$) is outside of the expected range identified by the model 86 or the bypass valve control algorithm for the current position (e.g., the open position or the closed position) of the bypass valve 80 measured by the valve position sensor 70D. In response to identifying the faulted condition of the sensor assembly 70, the controller 72 may generate a warning (e.g., an audible alarm, a warning light, a warning message, etc.) for a pilot or other operator of an aircraft on which the propulsion system 20 is installed, for example, to prompt the pilot or other operator to manually control the position of the bypass valve 80.

Step 408 includes controlling a position of the bypass valve 80, during operation of the gas turbine engine 22 and its engine oil system 34, with a faulted control routine in response to identifying the faulted condition of the sensor assembly 70 (see step 406). When executing the faulted control routine, the controller 72 may control the position of the bypass valve 80 using a simulated operating parameter of the engine oil system 34 determined by the model 86 or the bypass valve control algorithm for the current position of the bypass valve 80 measured by the valve position sensor 70D. Alternatively, the bypass valve 80 may be controlled manually by a pilot or other operator as discussed above.

In response to identification of a faulted condition of the temperature sensor 70A (see step 406), the controller 72 may control the position of the bypass valve 80 using a simulated value of the temperature ($T_{OIL}$) determined by the model 86 or the bypass valve control algorithm for the measured values of the inlet pressure ($P_{IN}$), the outlet pressure ($P_{OUT}$), and/or the differential pressure ($\Delta P_{OIL}$) for the current position of the bypass valve 80 measured by the valve position sensor 70D. With reference again to FIG. 5, in response to identifying the differential pressure ($\Delta P_{OIL}$) is greater than the differential pressure threshold ($\Delta P_T$), the controller 72 may identify the simulated oil temperature determined by the model 86 or the bypass valve control algorithm is greater than or less than the temperature threshold ($T_T$). In response to identifying the simulated oil temperature is less than the temperature threshold ($T_T$), the controller 72 may control the bypass valve 80 in the closed position such that all or substantially all oil flow through the filter assembly 68 is directed through the filter 78. In response to identifying the simulated oil temperature is greater than the temperature threshold ($T_T$), the controller 72 may control the bypass valve 80 in the open position such that at least a substantial portion of the oil flow through the filter assembly 68 is directed through the bypass valve 80, thereby bypassing the filter 78.

In response to identification of a faulted condition of one or both of the inlet pressure sensor 70B and the outlet pressure sensor 70C (see step 406), the controller 72 may control the position of the bypass valve 80 using a simulated value of the differential pressure ($\Delta P_{OIL}$) determined by the model 86 or the bypass valve control algorithm for the measured value of the temperature ($T_{OIL}$) for the current position of the bypass valve 80 measured by the valve position sensor 70D. With reference again to FIG. 5, the controller 72 may identify the simulated differential pressure determined by the model 86 or the bypass valve control algorithm is greater than or less than the differential pressure threshold ($\Delta P_T$). In response to identifying the simulated differential pressure is less than the differential pressure threshold ($\Delta P_T$), the controller 72 may control the bypass valve 80 in the closed position such that all or substantially all oil flow through the filter assembly 68 is directed through the filter 78. In response to identifying the simulated differential pressure is greater than the differential pressure threshold ($\Delta P_T$), the controller 72 may identify the temperature ($T_{OIL}$) is greater than or less than a temperature threshold ($T_T$). In response to identifying the temperature ($T_{OIL}$) is less than the temperature threshold ($T_T$), the controller 72 may control the bypass valve 80 in the closed position such that all or substantially all oil flow through the filter assembly 68 is directed through the filter 78. In response to identifying the temperature ($T_{OIL}$) is greater than the temperature threshold ($T_T$), the controller 72 may control the bypass valve 80 in the open position such that at least a substantial portion of the oil flow through the filter assembly 68 is directed through the bypass valve 80, thereby bypassing the filter 78.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An engine oil system for an aircraft propulsion system, the engine oil system comprising:

a filter assembly including an oil inlet, an oil outlet, a filter, and a bypass valve, the filter assembly forming a portion of an oil flow path of the engine oil system from the oil inlet to the oil outlet, each of the filter and the bypass valve connected in fluid communication with and between the oil inlet and the oil outlet, the bypass valve positionable in an open position and a closed position;

a sensor assembly including an inlet pressure sensor, an outlet pressure sensor, and a temperature sensor, the inlet pressure sensor disposed at the oil inlet, the outlet pressure sensor disposed at the oil outlet, and the temperature sensor disposed at the oil flow path; and a controller connected in signal communication with the inlet pressure sensor, the outlet pressure sensor, the temperature sensor, and the bypass valve, the controller including a processor connected in signal communication with a non-transitory memory storing instructions which, when executed by the processor, cause the processor to:

control positioning of the bypass valve to the open position or to the closed position with an unfaulted control routine using a temperature ($T_{OIL}$) measured by the temperature sensor and a differential pressure ($\Delta P_{OIL}$) measured by the inlet pressure sensor and the outlet pressure sensor;

execute a bypass valve control algorithm configured to identify a faulted condition and an unfaulted condition of the sensor assembly; and identify the faulted condition or the unfaulted condition of the sensor assembly using the bypass valve control algorithm, the faulted condition being identified where the temperature ($T_{OIL}$) or the differential pressure ($\Delta P_{OIL}$) is outside of an expected temperature range or an expected differential pressure range, respectively, determined by the bypass valve control algorithm based on the position of the bypass valve.

2. The engine oil system of claim 1, wherein the unfaulted condition is identified where the temperature ($T_{OIL}$) is within the expected temperature range and the differential pressure ($\Delta P_{OIL}$) is within the expected differential pressure range.

3. The engine oil system of claim 1, wherein the instructions, when executed by the processor, further cause the processor to control positioning of the bypass valve to the open position or to the closed position with a faulted control routine, in response to identifying the faulted condition, using:

a simulated temperature determined by the bypass valve control algorithm for the position of the bypass valve and the differential pressure ($\Delta P_{OIL}$); and the differential pressure ($\Delta P_{OIL}$).

4. The engine oil system of claim 3, wherein the instructions, when executed by the processor, further cause the processor to control positioning of the bypass valve to the open position, with the faulted control routine, where the simulated temperature is greater than a temperature threshold and control positioning of the bypass valve to the closed position, with the faulted control routine, where the simulated temperature is less than the temperature threshold.

5. The engine oil system of claim 1, wherein the instructions, when executed by the processor, further cause the processor to control positioning of the bypass valve to the open position or to the closed position with a faulted control routine, in response to identifying the faulted condition, using:

a simulated differential pressure determined by the bypass valve control algorithm for the position of the bypass valve and the temperature ($T_{OIL}$); and the temperature ($T_{OIL}$).

6. The engine oil system of claim 5, wherein the instructions, when executed by the processor, further cause the processor to control positioning of the bypass valve to the closed position, with the faulted control routine, where the simulated differential pressure is less than a differential pressure threshold.

7. The engine oil system of claim 6, wherein the instructions, when executed by the processor, further cause the processor to control positioning of the bypass valve to the open position, with the faulted control routine, where the simulated differential pressure is greater than the differential pressure threshold and the temperature ($T_{OIL}$) is greater than a temperature threshold.

8. The engine oil system of claim 6, wherein the instructions, when executed by the processor, further cause the processor to control positioning of the bypass valve to the closed position, with the faulted control routine, where the simulated differential pressure is greater than the differential pressure threshold and the temperature ($T_{OIL}$) is less than a temperature threshold.

9. The engine oil system of claim 1, wherein the instructions, when executed by the processor, further cause the processor to execute a model to:

train the model to identify the correlation or the non-correlation between the temperature ($T_{OIL}$) and the differential pressure ($\Delta P_{OIL}$) for a position of the bypass valve using the temperature ($T_{OIL}$) measured by the temperature sensor and the differential pressure ($\Delta P_{OIL}$) measured by the inlet pressure sensor and the outlet pressure sensor while controlling positioning of the bypass valve with the unfaulted control routine; and generate the bypass valve control algorithm.

10. The engine oil system of claim 1, wherein:

with the bypass valve in the closed position, the filter assembly directs substantially all of the oil along the oil flow path through the filter; and with the bypass valve in the open position, the filter assembly directs at least a portion of the oil along the oil flow path through the bypass valve bypassing the filter.

11. A method for controlling a bypass valve of an engine oil system for an engine of an aircraft propulsion system, the method comprising:

measuring a temperature ($T_{OIL}$) of oil within an oil flow path of the engine oil system and measuring a differential pressure ($\Delta P_{OIL}$) of the oil across a filter of the engine oil system during operation of the engine and the engine oil system with a sensor assembly;

controlling positioning of the bypass valve to an open position or to a closed position, with an unfaulted control routine executed at a controller, using the temperature ($T_{OIL}$) and the differential pressure ($\Delta P_{OIL}$), in the open position the bypass valve directing at least a portion of the oil through the bypass valve bypassing the filter, in the closed position the bypass valve directing substantially all of the oil along the oil flow path through the filter;

executing, at the controller, a model trained to identify correlation or non-correlation between the temperature ($T_{OIL}$) and the differential pressure ($\Delta P_{OIL}$) for the position of the bypass valve; and identifying a faulted condition or an unfaulted condition of the sensor assembly, at the controller using the model, the faulted condition identified where the temperature ($T_{OIL}$) or the differential pressure ($\Delta P_{OIL}$) is outside of an expected temperature range or an expected differential pressure range, respectively, determined by the model for the position of the bypass valve.

12. The method of claim 11, wherein the unfaulted condition is identified where the temperature ($T_{OIL}$) is within the expected temperature range and the differential pressure ($\Delta P_{OIL}$) is within the expected differential pressure range.

13. The method of claim 11, further comprising controlling positioning of the bypass valve to the open position or to the closed position with a faulted control routine executed at the controller, in response to identifying the faulted condition, using:

a simulated temperature determined by the model for the position of the bypass valve and the differential pressure ($\Delta P_{OIL}$); and the differential pressure ($\Delta P_{OIL}$).

14. The method of claim 11, further comprising controlling positioning of the bypass valve to the open position or to the closed position with a faulted control routine executed at the controller, in response to identifying the faulted condition, using:

a simulated differential pressure determined by the model for the position of the bypass valve and the temperature ($T_{OIL}$); and the temperature ($T_{OIL}$).

15. The method of claim 11, further comprising training the model to identify the correlation or the non-correlation between the temperature ($T_{OIL}$) and the differential pressure ($\Delta P_{OIL}$) for the position of the bypass valve using the temperature ($T_{OIL}$) and the differential pressure ($\Delta P_{OIL}$) measured by the sensor assembly and while controlling positioning of the bypass valve with the unfaulted control routine.

16. The method of claim 11, wherein identifying the faulted condition or the unfaulted condition includes generating a warning in response to identification of the faulted condition.

17. An engine for an aircraft propulsion system, the engine comprising:

an engine oil system including an oil flow path, a filter
assembly, and a sensor assembly, the engine oil system
configured to direct oil along the oil flow path through
one or more engine oil loads of the engine, the filter assembly including an oil inlet, an oil outlet, a
filter, and a bypass valve, the filter assembly forming a
portion of the oil flow path from the oil inlet to the oil
outlet, each of the filter and the bypass valve connected
in fluid communication with and between the oil inlet
and the oil outlet, the bypass valve positionable in an
open position and a closed position, and a sensor assembly configured to measure a temperature
($T_{OIL}$) of the oil in the oil flow path and a differential
pressure ($\Delta P_{OIL}$) of the oil across the filter; and a controller connected in signal communication with the
sensor assembly and the bypass valve, the controller
including a processor connected in signal communica-
tion with a non-transitory memory including instruc-
tions which, when executed by the processor, cause the
processor to:

control positioning of the bypass valve to the open
position or to the closed position with an unfaulted
control routine using the temperature ($T_{OIL}$) and the
differential pressure ($\Delta P_{OIL}$);

execute a model trained to identify correlation or non-
correlation between the temperature ($T_{OIL}$) and the
differential pressure ($\Delta P_{OIL}$) for a position of the bypass
valve; and identify a faulted condition or an unfaulted condition of
the sensor assembly using the model, the faulted condition identified where the temperature ($T_{OIL}$) or the
differential pressure ($\Delta P_{OIL}$) is outside of an expected
temperature range or an expected differential pressure
range, respectively, determined by the model for the
position of the bypass valve.

18. The engine of claim 17, wherein the unfaulted con-
dition is identified where the temperature ($T_{OIL}$) is within the
expected temperature range and the differential pressure
($\Delta P_{OIL}$) is within the expected differential pressure range.

19. The engine of claim 17, wherein the instructions,
when executed by the processor, further cause the processor
to control positioning of the bypass valve to the open
position or to the closed position with a faulted control
routine, in response to identifying the faulted condition,
using:

a simulated temperature determined by the model for the
position of the bypass valve and the differential pres-
sure ($\Delta P_{OIL}$); and the differential pressure ($\Delta P_{OIL}$).

20. The engine of claim 17, wherein the instructions,
when executed by the processor, further cause the processor
to control positioning of the bypass valve to the open
position or to the closed position with a faulted control
routine, in response to identifying the faulted condition,
using:

a simulated differential pressure determined by the model
for the position of the bypass valve and the temperature
($T_{OIL}$); and the temperature ($T_{OIL}$).

* * * * *